US010677149B2

(12) United States Patent
Sase et al.

(10) Patent No.: US 10,677,149 B2
(45) Date of Patent: Jun. 9, 2020

(54) SURGE AVOIDANCE CONTROL METHOD AND SURGE AVOIDANCE CONTROL DEVICE FOR EXHAUST TURBINE TURBOCHARGER

(71) Applicant: MITSUBISHI HEAVY INDUSTRIES ENGINE & TURBOCHARGER, LTD., Sagamihara-shi, Kanagawa (JP)

(72) Inventors: Ryo Sase, Tokyo (JP); Naoki Yahata, Tokyo (JP)

(73) Assignee: MITSUBISHI HEAVY INDUSTRIES ENGINE & TURBOCHARGER, LTD., Sagamihara-Shi, Kangawa (JP)

(*) Notice: Subject to any disclaimer, the term of this patent is extended or adjusted under 35 U.S.C. 154(b) by 0 days.

(21) Appl. No.: 15/781,864

(22) PCT Filed: Mar. 8, 2016

(86) PCT No.: PCT/JP2016/057166
§ 371 (c)(1),
(2) Date: Jun. 6, 2018

(87) PCT Pub. No.: WO2017/154106
PCT Pub. Date: Sep. 14, 2017

(65) Prior Publication Data
US 2018/0363541 A1 Dec. 20, 2018

(51) Int. Cl.
F02B 37/16 (2006.01)
F02B 37/18 (2006.01)
(Continued)

(52) U.S. Cl.
CPC .............. F02B 37/16 (2013.01); F02B 37/12 (2013.01); F02B 37/18 (2013.01); F02B 37/22 (2013.01);
(Continued)

(58) Field of Classification Search
CPC ...... F02B 37/162; F02B 37/225; F02B 37/22; F02B 2037/125; F02M 35/1038;
(Continued)

(56) References Cited

U.S. PATENT DOCUMENTS 4,749,331 A * 6/1988 Blotenberg ........... F04D 27/001
340/966
4,936,741 A 6/1990 Blotenberg
(Continued)

FOREIGN PATENT DOCUMENTS

EP 0 871 853 A1 10/1998
EP 3 315 749 A1 5/2018
(Continued)

OTHER PUBLICATIONS

International Preliminary Report on Patentability and English translation of the Written Opinion of the International Searching Authority (Forms PCT/IB/338, PCT/IB/373 and PCT/ISA/237) for International Application No. PCT/JP2016/057166, dated Sep. 20, 2018.
(Continued)

Primary Examiner — Mark A Laurenzi
Assistant Examiner — Mickey H France
(74) Attorney, Agent, or Firm — Birch, Stewart, Kolasch & Birch, LLP

(57) ABSTRACT

A surge avoidance control method that includes a surge detection step of determining whether the operation point of the compressor is positioned in a surge operation region at each predetermined timing; a surge avoidance opening-degree calculation step calculating a surge avoidance opening degree of the operation device necessary for moving the operation point of the compressor determined to be positioned in the surge operation region in the surge detection step out of the surge operation region; a correction opening-degree calculation step calculating a correction opening
(Continued)

degree of the operation device on the basis of a moving velocity of the operation point of the compressor which is determined to be positioned in the surge operation region in the surge detection step; and an opening-degree command value calculation step calculating an opening-degree command value of the operation device on the basis of the surge avoidance opening degree and the correction opening degree.

12 Claims, 9 Drawing Sheets

(51) Int. Cl.
    *F02B 37/24*     (2006.01)
    *F02B 37/12*     (2006.01)
    *F02B 39/16*     (2006.01)
    *F02D 41/00*     (2006.01)
    *F02B 37/22*     (2006.01)
    *F04D 27/00*     (2006.01)
    *F04D 27/02*     (2006.01)

(52) U.S. Cl.
    CPC .............. *F02B 37/24* (2013.01); *F02B 39/16* (2013.01); *F02D 41/0007* (2013.01); *F04D 27/001* (2013.01); *F04D 27/0223* (2013.01); *F04D 27/0246* (2013.01); *F04D 27/0261* (2013.01); *F02B 2037/125* (2013.01); *F02D 2200/101* (2013.01); *F02D 2200/602* (2013.01); *Y02T 10/144* (2013.01)

(58) Field of Classification Search
    CPC ........ F02M 35/10157; F02M 35/10163; F02D 41/0007; F02D 2200/04; F02D 2200/1002
    USPC .......................................... 60/600, 601, 611
    See application file for complete search history.

(56) References Cited

U.S. PATENT DOCUMENTS

| | | |
|---|---|---|
| 5,798,941 A | 8/1998 | McLeister |
| 2009/0198432 A1* | 8/2009 | Tabata .................... F02D 23/02 701/103 |
| 2016/0265468 A1 | 9/2016 | Takayanagi et al. |
| 2016/0305353 A1 | 10/2016 | Sase et al. |

FOREIGN PATENT DOCUMENTS

| | | |
|---|---|---|
| JP | 1-285698 A | 11/1989 |
| JP | 11-506184 A | 6/1999 |
| JP | 2009-167963 A | 7/2009 |
| JP | 2012-180746 A | 9/2012 |
| JP | 5120343 B2 | 1/2013 |
| JP | 5195142 B2 | 5/2013 |
| WO | WO 2015/083611 A1 | 6/2015 |
| WO | WO 2015/083658 A1 | 6/2015 |

OTHER PUBLICATIONS

International Search Report and Written Opinion of the International Searching Authority (Forms PCT/ISA/210, PCT/ISA/220 and PCT/ISA/237) for International Application No. PCT/JP2016/057166, dated May 24, 2016.
Extended European Search Report effective Nov. 23, 2018 issued in corresponding European Application No. 16893438.8.
European Office Action effective Jul. 4, 2019 issued in the corresponding European Application No. 16893438.8.
Office Action dated Dec. 18, 2019 issued in the corresponding European Application No. 16893438.8.
Office Action dated Dec. 30, 2019 issued to the corresponding Chinese Application No. 201680078419.2 with an English machine translation.

\* cited by examiner

SURGE AVOIDANCE CONTROL METHOD AND SURGE AVOIDANCE CONTROL DEVICE FOR EXHAUST TURBINE TURBOCHARGER

TECHNICAL FIELD

The present disclosure relates to a control device of a turbocharger, and especially to a technique for avoiding surging of a turbocharger.

BACKGROUND ART

In an engine used for an automobile or the like, an exhaust turbocharger is widely used, in which a turbine is rotated by exhaust gas energy of the engine and a centrifugal compressor directly coupled to the turbine compresses intake air and supplies the engine with the intake air, to improve the output of the engine. Furthermore, turbochargers having a variable mechanism such as variable geometry (VG) turbochargers and waste-gate valve mounted (WG) turbochargers are becoming popular. By controlling the operation condition of a turbocharger with such a variable mechanism, the boost pressure is adjusted to a pressure suitable to the operation state of the engine, and the fuel consumption efficiency and drivability of the engine are improved. On the other hand, a turbocharger may enter an abnormal operation state called surging, depending on the operation condition. Surging leads to breakage of a turbocharger, and thus it is critical to perform an avoidance operation (avoidance control) as soon as possible to avoid surging, if surging is detected.

Generally, surging can be detected by fluctuation of pressure, flow rate, temperature, or the like. For instance, in Patent Documents 1 and 2, the operation point of the compressor in operation is detected from the pressure ratio of pressures at the inlet and the outlet of the compressor and the inflow amount (intake flow rate) of intake air into the compressor. Further, it is confirmed whether the detected operation point is positioned in the surge operation region where surging could occur defined on the compressor map, and an avoidance operation of surging is performed if the operation point is in the surge operation region. Furthermore, a specific technique to perform the avoidance operation of surging, as in Patent Document 1, includes setting the opening degree of operation devices, such as the opening degree of a compressor bypass valve, the nozzle opening degree of a VG (variable geometry nozzle mechanism), and the opening degree of a WG valve, to fully open. Some techniques do not fully open the opening degree of an operation device. For instance, Patent Document 2 discloses preventing occurrence of surging with a margin by setting a surge prevention line taking into account the responsiveness of the compressor bypass valve for a surge line which is a boundary between the surge operation region and the normal operation region, when opening the compressor bypass valve, and controlling the operation point with reference to the surge prevention line.

CITATION LIST

Patent Literature

Patent Document 1: JP5120343B
Patent Document 2: 2012-180746A

SUMMARY

Problems to be Solved

However, the above described typical techniques have the following problems. For instance, in the VG turbocharger, the boost pressure of the compressor is controlled to a target boost pressure determined on the basis of the operation state of the engine, by controlling the nozzle opening degree of the variable nozzle mechanism. Further, as shown in FIG. 6 described below, in an assumed case, as the nozzle opening degree is controlled so as to achieve the target boost pressure corresponding to the change in the operation state of the engine, the operation point of the compressor moves from the normal operation region (Rn) on the compressor map to a predetermined position in the surge operation region (Rs). In this case, if the operation point is monitored with a period adequately shorter than the transfer period of the operation point, for instance, it is detected that the operation point (R0) positioned in the normal operation region in the compressor map is positioned in the surge operation region (R1) at the next moment. Furthermore, even after the detection, in a case where surging avoidance operation is not performed, the operation point moves in the surge operation region to the predetermined position (R2) with time. That is, provided that the operation point determined to be in the surge operation region firstly is called as the first surge operation point (R1), the first surge operation point (R1) corresponds to the operation point (in a transient period) that is midway the entire period in which the operation point moves in the surge operation region to the above predetermined position (R2). Furthermore, for instance, if the opening-degree command value is calculated only on the basis of information of the first surge operation point (R1) (coordinate on the compressor map), the opening-degree command value is calculated on the operation point (R1) in a transient period, and thus it may be impossible to move the operation point to a normal operation region out of the surge operation region due to movement of the operation point after the surge operation point (R1).

In this situation, to avoid surging, it is effective to fully open the opening degree of an operation device at the time of detection of entry of the operation point of the compressor into the surge operation region. However, the boost pressure would decrease at the same time, and re-acceleration from this state may be retarded. Furthermore, in the control technique having a margin with respect to surging, the opening degree of an operation device is increased more than necessary particularly in a case where the operation point stays in the vicinity of the operation point determined to be in the surge operation region, and thus it is not possible to operate the compressor to the vicinity of the limit of the surge line. Thus, the boost pressure decreases unnecessarily, and the performance of the compressor cannot be exerted at the best.

In view of the above, an embodiment of the present invention is to provide a surge avoidance control method for an exhaust turbocharger capable of suppressing an excessive decrease in the boost pressure during avoidance control of surging.

Solution to the Problems (1) A surge avoidance control method of avoiding surging in an exhaust turbocharger which comprises a turbine rotated by exhaust gas from an engine and a compressor rotatably driven by the turbine, by controlling an opening degree of an operation device capable of adjusting an operation point of the compressor between fully open and fully closed, according to at least one embodiment of the present invention, includes: a surge detection step of determining whether the operation point of the compressor is positioned in a surge operation region at each predetermined timing; a surge avoidance opening-degree calculation step of calculating a surge avoidance opening degree of the operation device necessary for moving the operation point of the compressor determined to be positioned in the surge operation region in the surge detection step out of the surge operation region; a correction opening-degree calculation step of calculating a correction opening degree of the operation device on the basis of a moving velocity of the operation point of the compressor which is determined to be positioned in the surge operation region in the surge detection step; and an opening-degree command value calculation step of calculating an opening-degree command value of the operation device on the basis of the surge avoidance opening degree and the correction opening degree.

With the above configuration (1), the opening degree command value (opening degree) of the operation device which is a compressor bypass valve, a waste-gate valve, or a variable nozzle mechanism capable of adjusting the operation point of the compressor, is calculated on the basis of the surge avoidance opening degree and the correction opening degree. The surge avoidance opening degree is an opening degree calculated from the operation point (surge operation point) at the time of transition during movement of the operation point of the compressor toward a target boost pressure corresponding to the change in the operation state of the engine. Furthermore, the correction opening degree is an index related to the moving velocity of the operation point of the surge operation point. Accordingly, at the time of transition of the operation point of the compressor which moves in accordance with a change in the operation state of the engine, the opening degree command value is calculated by adding the above described correction opening degree to the surge avoidance opening degree calculated on the basis of the surge operation point at the time of transition, and thereby it is possible to control the operation point of the compressor to the vicinity of the surge line outside the surge operation region (in the normal operation region), as compared to a case of changing the opening degree of the operation device to the fully-open position or controlling the opening degree with a margin. Accordingly, it is possible to suppress an excessive decrease in the boost pressure in the surging avoidance control, and to maximize the performance of the compressor, while easily performing re-acceleration from the state in which the opening degree of the operation device is changed to avoid surging. Furthermore, by calculating the opening degree command value at the time of transition in movement of the operation point of the compressor, it is possible to perform the surging avoidance operation quickly, and to avoid occurrence of surging more reliably.

(2) In some embodiments, in the above configuration (1), the correction opening-degree calculation step includes calculating the correction opening degree so that the correction opening degree increases in accordance with a magnitude of the moving velocity, and the opening-degree command value calculation step includes calculating the opening-degree command value of the operation device by adding the correction opening degree to the surge avoidance opening degree.

With the above configuration (2), the higher the moving velocity of the operation point from the surge operation point is, the more the pressure ratio of the outlet pressure to the inlet pressure of the compressor is predicted to increase. Thus, to reduce the pressure ratio even further, the opening degree command value is increased. In other words, the higher the moving velocity from the surge operation point is, the smaller the opening degree command value is. As described above, by adjusting the opening degree command value in accordance with the moving velocity of the operation point from the surge operation point, it is possible to move the operation point of the compressor to the vicinity of the limit of the surge line from the surge operation point. Accordingly, it is possible to suppress an excessive decrease in the boost pressure in the surging avoidance control.

(3) In some embodiments, in any one of the above configurations (1) and (2), the operation device comprises a compressor bypass valve disposed in a compressor bypass passage which brings into communication a downstream side and an upstream side of the compressor in an intake passage of the engine.

With the above configuration (3), it is possible to avoid surging by controlling the opening degree of the compressor bypass valve disposed in the compressor bypass passage. Furthermore, with the compressor bypass valve, it is possible to reduce the pressure ratio of the outlet pressure to the inlet pressure of the compressor directly, and thus it is possible to enhance the responsiveness of control of the operation point of the compressor in accordance with the avoidance operation of surging.

(4) In some embodiments, in any one of the above configurations (1) and (2), the operation device comprises a variable nozzle mechanism capable of adjusting a flow velocity of exhaust gas which flows into the turbine.

With the above configuration (4), it is possible to avoid surging by controlling the opening degree of the variable nozzle mechanism. Furthermore, with the operation device being the variable nozzle mechanism provided for the VG turbocharger, it is possible to suppress a cost increase.

(5) In some embodiments, in any one of the above configurations (1) and (2), the operation device comprises a waste-gate valve disposed in a turbine bypass passage which brings into communication a downstream side and an upstream side of the turbine in an exhaust passage of the engine.

With the above configuration (5), it is possible to avoid surging by controlling the opening degree of the waste-gate valve disposed in the turbine bypass passage. Furthermore, with the operation device being the waste-gate valve provided for the waste-gate valve mounted turbocharger, it is possible to suppress a cost increase.

(6) In some embodiments, in any one of the above configurations (3) to (5), the surge avoidance control method further includes: a target boost-pressure calculation step for calculating a target boost pressure at a downstream side of the compressor on the basis of a rotation speed and an accelerator position of the engine; a boost-pressure detection step of detecting a boost pressure at the downstream side of the compressor; and an opening degree control step of controlling a nozzle opening degree of a variable nozzle mechanism capable of adjusting a flow velocity of exhaust gas which flows into the turbine so that the boost pressure matches the target boost pressure. The target boost-pressure calculation step, the boost-pressure detection step, and the opening-degree control step are performed if it is determined that the operation point of the compressor is not positioned in the surge operation region in the surge detection step.

With the above configuration (6), it is possible to control the actual boost pressure to be the target boost pressure corresponding to the operation state of the engine with the variable nozzle mechanism, in a case where the operation point of the compressor is positioned in the normal operation region. Furthermore, in a case where the operation point of the compressor is positioned in the surge operation region, it is possible to avoid surging with the operation device (compressor bypass valve, variable nozzle mechanism, waste-gate valve).

(7) In some embodiments, in the above configuration (3), the surge avoidance control method further includes: a target boost-pressure calculation step for calculating a target boost pressure at a downstream side of the compressor on the basis of a rotation speed and an accelerator position of the engine; a boost-pressure detection step of detecting a boost pressure at the downstream side of the compressor; and an opening degree control step of controlling an opening degree of a waste-gate valve disposed in a turbine bypass passage which brings into communication a downstream side and an upstream side of the turbine in an exhaust passage of the engine so that the boost pressure matches the target boost pressure. The target boost-pressure calculation step, the boost-pressure detection step, and the opening-degree control step are performed if it is determined that the operation point of the compressor is not positioned in the surge operation region in the surge detection step.

With the above configuration (7), it is possible to control the actual boost pressure to the target boost pressure corresponding to the operation state of the engine with the waste-gate valve, in a case where the operation point of the compressor is positioned in the normal operation region. Furthermore, in a case where the operation point of the compressor is positioned in the surge operation region, it is possible to avoid surging with the operation device (compressor bypass valve).

(8) A surge avoidance control device for an exhaust turbocharger which comprises a turbine rotated by exhaust gas from an engine and a compressor rotatably driven by the turbine, by controlling an opening degree of an operation device capable of adjusting an operation point of the compressor between fully open and fully closed, according to at least one embodiment of the present invention, includes: a surge detection part configured to determine whether the operation point of the compressor is positioned in a surge operation region at each predetermined timing; a surge avoidance opening-degree calculation part configured to calculate a surge avoidance opening degree of the operation device necessary for moving the operation point of the compressor determined to be positioned in the surge operation region by the surge detection part out of the surge operation region; a correction opening-degree calculation part configured to calculate a correction opening degree of the operation device on the basis of a moving velocity of the operation point of the compressor which is determined to be positioned in the surge operation region by the surge detection part; and an opening-degree command value calculation step of calculating an opening-degree command value of the operation device on the basis of the surge avoidance opening degree and the correction opening degree.

With the above configuration (8), it is possible to provide a surge avoidance control device which performs the above surge avoidance control method (1). Accordingly, it is possible to suppress an excessive decrease in the boost pressure in the surging avoidance control, and to maximize the performance of the compressor, while easily performing re-acceleration from the state in which the opening degree of the operation device is changed to avoid surging. Furthermore, by calculating the opening degree command value at the time of transition in movement of the operation point of the compressor, it is possible to perform the surging avoidance operation quickly, and to avoid occurrence of surging more reliably.

(9) In some embodiments, in the above configuration (8), the correction opening-degree calculation part is configured to calculate the correction opening degree so that the correction opening degree increases in accordance with a magnitude of the moving velocity, and the opening-degree command value calculation part is configured to calculate the opening-degree command value of the operation device by adding the correction opening degree to the surge avoidance opening degree.

With the above configuration (9), it is possible to provide a surge avoidance control device which performs the above surge avoidance control method (2). Accordingly, it is possible to suppress an excessive decrease in the boost pressure in the surging avoidance control.

(10) In some embodiments, in any one of the above configurations (8) and (9), the operation device comprises a compressor bypass valve disposed in a compressor bypass passage which brings into communication a downstream side and an upstream side of the compressor in an intake passage of the engine.

With the above configuration (10), similarly to the above (3), it is possible to avoid surging while enhancing the responsiveness of control of the operation point of the compressor corresponding to the avoidance operation of surging.

(11) In some embodiments, in any one of the above configurations (8) and (9), the operation device comprises a variable nozzle mechanism capable of adjusting a flow velocity of exhaust gas which flows into the turbine.

With the above configuration (11), similarly to the above (4), it is possible to avoid surging by controlling the opening degree of the variable nozzle mechanism. Furthermore, with the operation device being the variable nozzle mechanism provided for the VG turbocharger, it is possible to suppress a cost increase.

(12) In some embodiments, in any one of the above configurations (8) and (9), the operation device includes a waste-gate valve disposed in a turbine bypass passage which brings into communication a downstream side and an upstream side of the turbine in an exhaust passage of the engine.

Furthermore, with the operation device being the waste-gate valve provided for the waste-gate valve mounted turbocharger, it is possible to suppress a cost increase.

With the above configuration (12), similarly to the above (5), it is possible to avoid surging by controlling the opening degree of the waste-gate valve disposed in the turbine bypass passage.

(13) In some embodiments, in any one of the above configurations (10) to (12), the surge avoidance control device further includes a target boost-pressure calculation part configured to calculate a target boost pressure at a downstream side of the compressor on the basis of a rotation speed and an accelerator position of the engine; a boost-pressure detection part configured to detect a boost pressure at the downstream side of the compressor; and an opening-degree control part configured to control a nozzle opening degree of a variable nozzle mechanism capable of adjusting a flow velocity of exhaust gas which flows into the turbine so that the boost pressure matches the target boost pressure. The target boost-pressure calculation part, the boost-pressure detection part, and the opening-degree control part are performed if it is determined that the operation point of the compressor is not positioned in the surge operation region by the surge detection part.

With the above configuration (13), similarly to the above (6), it is possible to control the actual boost pressure to be the target boost pressure corresponding to the operation state of the engine with the variable nozzle mechanism, in a case where the operation point of the compressor is positioned in the normal operation region. Furthermore, in a case where the operation point of the compressor is positioned in the surge operation region, it is possible to avoid surging with the operation device (compressor bypass valve, variable nozzle mechanism, waste-gate valve).

(14) In some embodiments, in the above configuration (10), the surge avoidance control device further includes a target boost-pressure calculation part configured to calculate a target boost pressure at a downstream side of the compressor on the basis of a rotation speed and an accelerator position of the engine; a boost-pressure detection part configured to detect a boost pressure at the downstream side of the compressor; and an opening-degree control part configured to control an opening degree of a waste-gate valve disposed in a turbine bypass passage which brings into communication a downstream side and an upstream side of the turbine in an exhaust passage of the engine so that the boost pressure matches the target boost pressure. The target boost-pressure calculation part, the boost-pressure detection part, and the opening-degree control part are performed if it is determined that the operation point of the compressor is not positioned in the surge operation region by the surge detection part.

With the above configuration (14), similarly to the above (7), it is possible to control the actual boost pressure to the target boost pressure corresponding to the operation state of the engine with the waste-gate valve, in a case where the operation point of the compressor is positioned in the normal operation region. Furthermore, in a case where the operation point of the compressor is positioned in the surge operation region, it is possible to avoid surging with the operation device (compressor bypass valve).

Advantageous Effects

According to an embodiment of the present invention, it is possible to provide a surge avoidance control method for an exhaust turbocharger capable of suppressing an excessive decrease in the boost pressure during avoidance control of surging.

DETAILED DESCRIPTION

Figure 1:
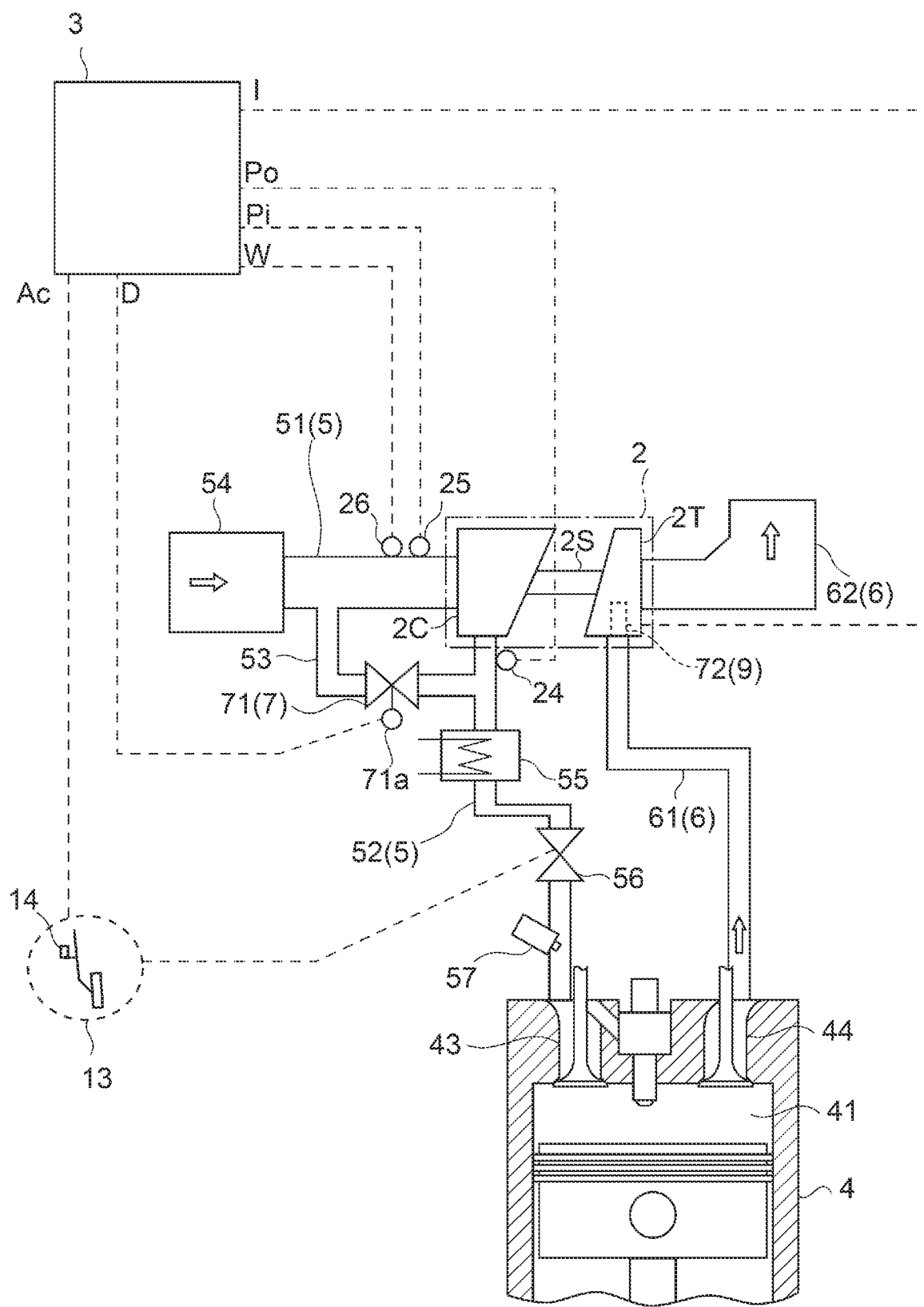
FIG. 1 includes a schematic diagram of an engine system including a surge avoidance control device of an exhaust turbocharger according to an embodiment of the present invention, wherein a VG turbocharger includes a compressor bypass valve as an operation device.

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

On the other hand, an expression such as "comprise", "include", "have", "contain" and "constitute" are not intended to be exclusive of other components.

FIGS. 1 to 4 are schematic diagrams of an engine system 1 including a surge avoidance control device 3 of an exhaust turbocharger 2 according to an embodiment of the present invention. As shown in FIGS. 1 to 4, the engine system 1 includes an exhaust turbocharger 2 and a surge avoidance control device 3. While FIGS. 1 to 4 shows the engine system 1 of a gasoline engine as an example, the present invention can be also applied to a diesel engine. Furthermore, the engine system 1 can be also applied to various fields, such as automobile, truck, bus, ship, industrial engine, etc.

Each configuration of the engine system 1 will now be described.

As shown in FIGS. 1 to 4, the exhaust turbocharger 2 includes a turbine 2T rotated by exhaust gas from the engine 4 (engine body) and a compressor 2C rotary driven by the turbine 2T. More specifically, the compressor 2C disposed in the intake passage 5 of the engine 4 is coupled to the turbine 2T disposed in the exhaust passage 6 of the engine 4 via a rotational shaft 2S. Further, as exhaust gas discharged from the combustion chamber 41 of the engine 4 rotates the turbine 2T when passing through the exhaust passage 6 toward the outside, the compressor 2C coupled coaxially to the turbine 2T rotates, and intake air flowing through the intake passage 5 is compressed.

In the embodiment shown in FIGS. 1 to 4, as shown in the drawings, the intake passage 5 includes an upstream intake passage 51 which brings into communication an intake duct (not shown) serving as an intake port of intake air and an inlet of the compressor 2C (intake air inflow port), and a downstream intake passage which brings into communication the outlet of the compressor 2C (intake air discharge port) and an intake port 43 of the engine 4. Further, air (intake air) taken in from the intake duct (not shown) flows through the intake passage 5 toward the combustion chamber 41 of the engine 4, passing through the upstream intake passage 51 and the downstream intake passage 52 in this order. When flowing through the upstream intake passage 51, intake air is deprived of foreign substances such as dust and dirt by passing through an air cleaner 54 disposed in the upstream intake passage 51, and is compressed when passing through the compressor 2C from the inlet to the outlet. Furthermore, the intake air compressed by the compressor 2C passes through, when flowing through the downstream intake passage 52 toward the combustion chamber 41, an inter cooler 55 for increasing the intake air density by cooling, and a throttle valve 56 for adjusting the flow rate of intake air (intake flow rate W) in accordance with the operation amount of an accelerator pedal (accelerator position Ac) disposed in the downstream intake passage 52 in this order. Then, the intake air is mixed with fuel injected from the fuel injection nozzle 57, and enters the combustion chamber 41.

Meanwhile, the exhaust passage 6 includes an upstream exhaust passage 61 which brings into communication the exhaust port 44 of the engine 4 and an inlet of the turbine 2T (exhaust inlet) and a downstream exhaust passage 62 which brings into communication the outlet of the turbine 2T (exhaust outlet) and the outside. Further, exhaust gas generated by combustion in the combustion chamber 41 (combustion gas) flows outward through the exhaust passage 6, passing through the upstream exhaust passage 61 and the downstream exhaust passage 62 in this order. Exhaust gas having passed through the upstream exhaust passage 61 of the exhaust passage 6 rotates the turbine 2T when passing through the turbine 2T from the inlet to the outlet. Then, exhaust gas passes through the downstream exhaust passage 62 and flows toward the outside.

Furthermore, various sensors for detecting the boost pressure of the turbocharger 2 in operation of the operation point of the compressor 2C are disposed in the intake passage 5 and the exhaust passage 6, and the detection results of the various sensors are used in the surge avoidance control and the boost pressure control by the surge avoidance control device 3 described below. In the embodiment shown in FIGS. 1 to 4, as shown in the drawings, a boost pressure sensor 24 is disposed in the downstream intake passage 52 so as to detect the boost pressure (outlet pressure Po) of the compressor 2C. Furthermore, an inlet pressure sensor 25 capable of detecting the pressure of the inlet of the compressor 2C (inlet pressure Pi) and an intake flow rate sensor 26 capable of detecting the intake flow rate W that enters the compressor 2C are disposed in the upstream intake passage 51. Furthermore, the operation point of the compressor 2C is obtained from the pressure ratio Pf (Po/Pi) of the outlet pressure Po to the inlet pressure Pi and the intake flow rate W. Further, as long as the operation point of the compressor 2C and the boost pressure can be obtained, sensors different from the above may be used, or another technique can be employed.

Figure 2:
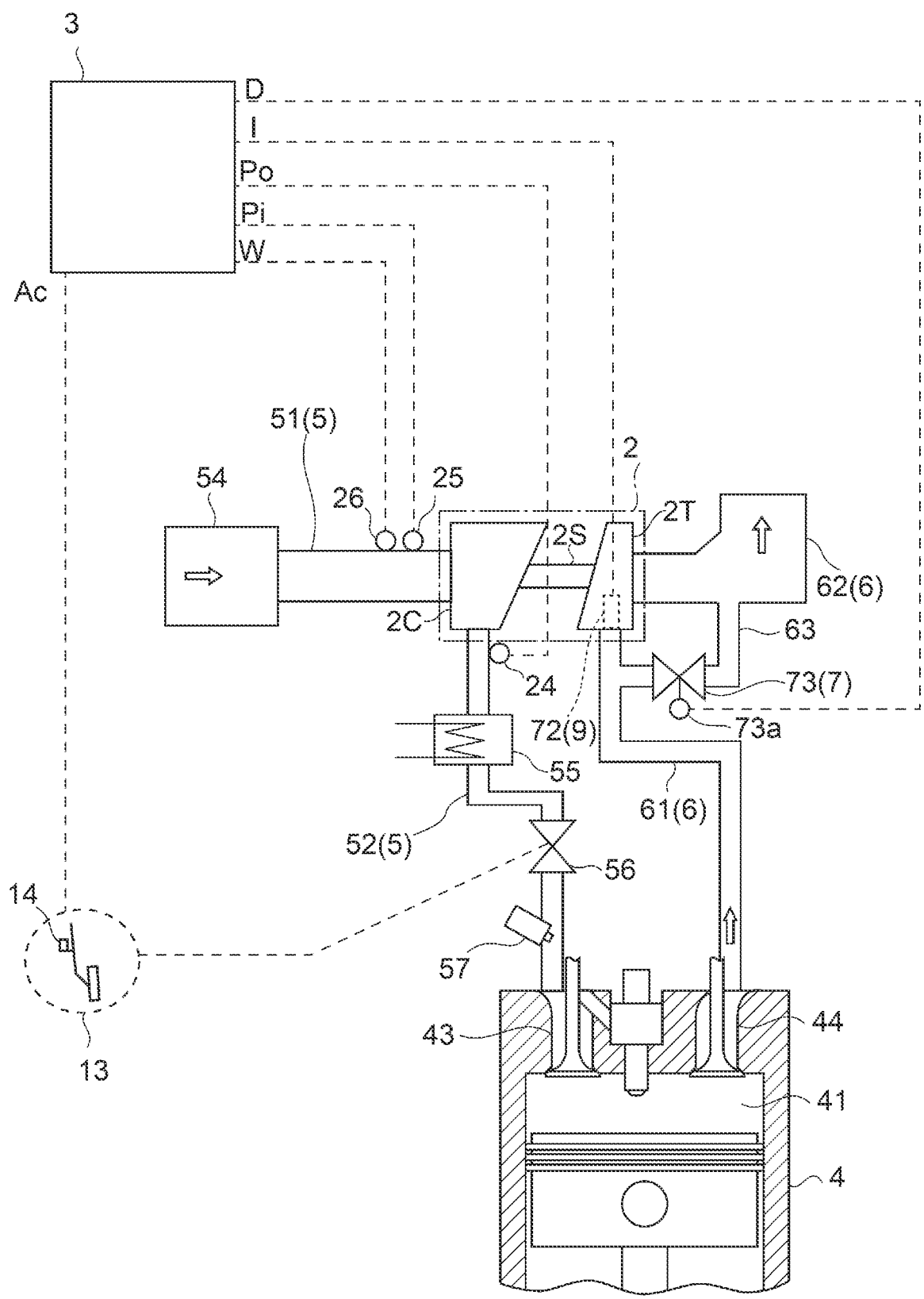
FIG. 2 includes a schematic diagram of an engine system including a surge avoidance control device of an exhaust turbocharger according to an embodiment of the present invention, wherein a VG turbocharger includes a waste-gate valve as an operation device.
Figure 3:
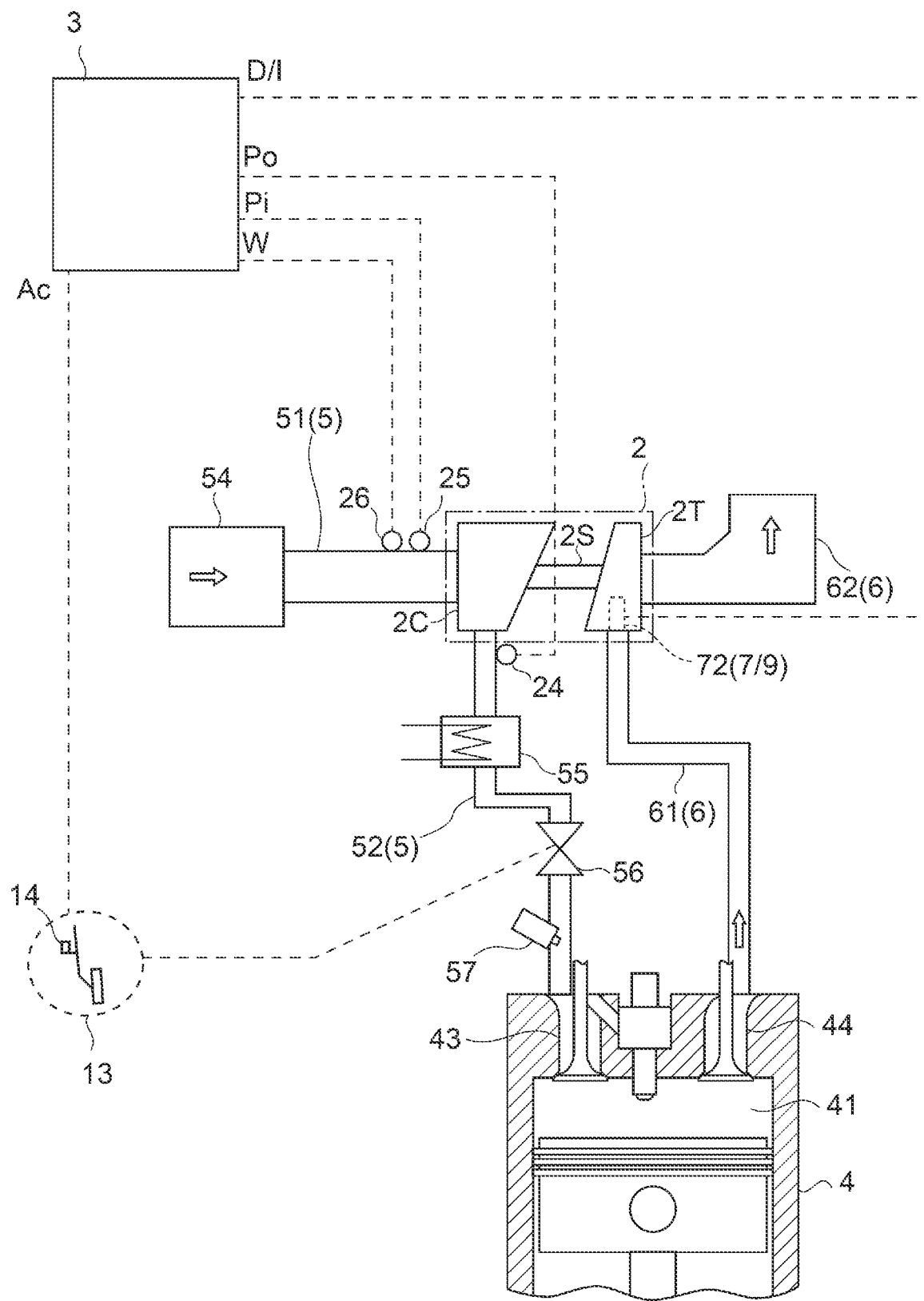
FIG. 3 includes a schematic diagram of an engine system including a surge avoidance control device of an exhaust turbocharger according to an embodiment of the present invention, wherein a VG turbocharger also uses a variable geometry nozzle mechanism (VG) as an operation device.

Herein, the turbocharger 2 of each embodiment shown in FIGS. 1 to 4 will be described. The turbocharger 2 in FIGS. 1 to 3 is a VG (variable geometry) turbocharger. The VG turbocharger includes a variable nozzle mechanism 72 capable of adjusting the flow velocity of exhaust gas that flows into the turbine 2T (turbine rotor blade). Further, the nozzle opening degree of the variable nozzle mechanism 72 is adjusted in accordance with the operation state of the engine 4, and the exhaust gas pressure toward the turbine rotor blade is adjusted, thereby controlling the boost pressure to the optimum condition. For instance, as already known, the nozzle opening degree is reduced to increase the exhaust gas pressure during low-speed rotation of the engine 4, and the nozzle opening degree is increased during high-speed rotation of the engine 4. As shown in the drawings, the turbocharger 2 shown in FIG. 2 is also a waste-gate valve mounted turbocharger including a waste-gate valve 73. The operation state of the engine 4 may be monitored with the rotation speed N of the engine 4 described below, and the accelerator position Ac (%).

Figure 4:
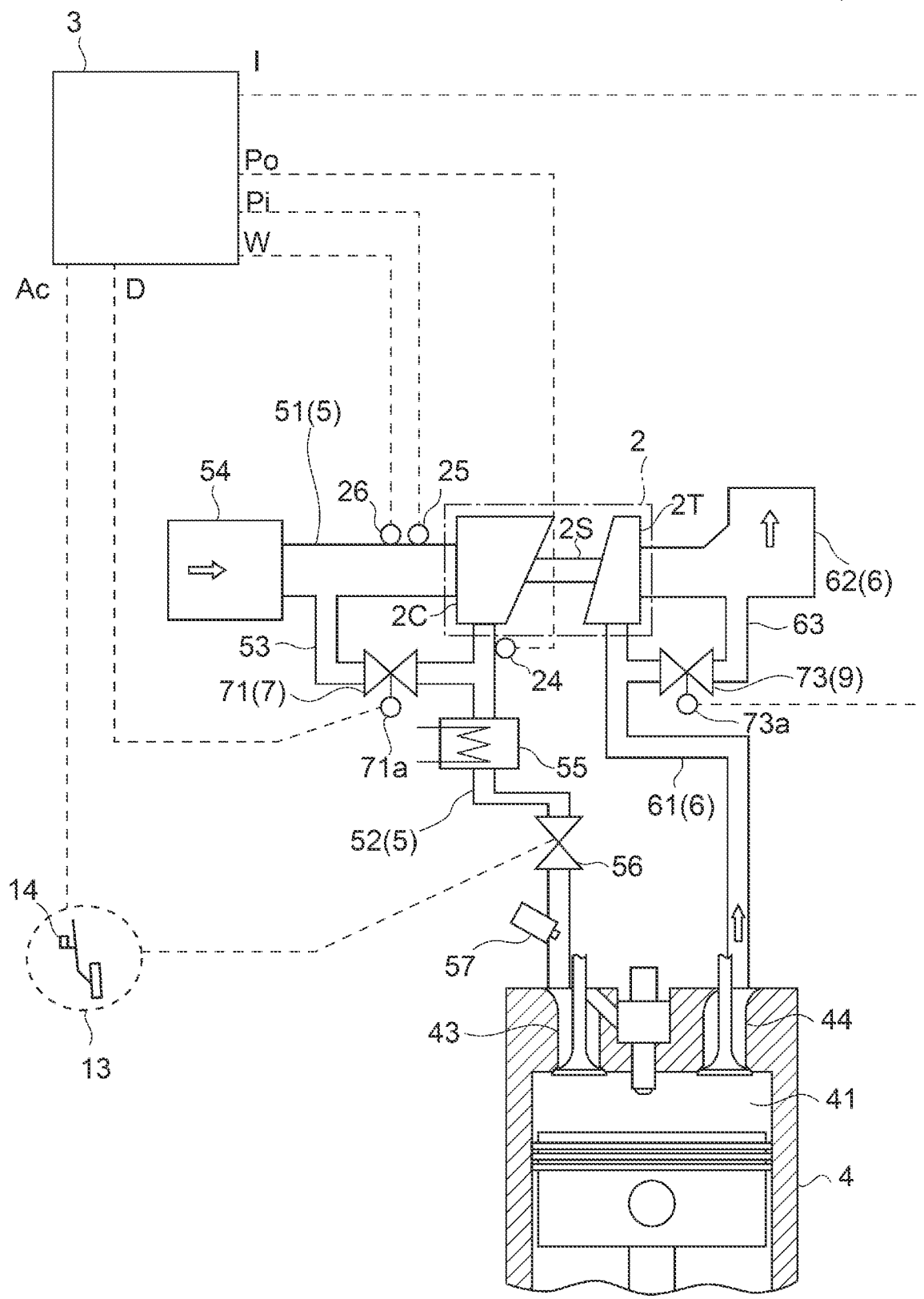
FIG. 4 includes a schematic diagram of an engine system including a surge avoidance control device of an exhaust turbocharger according to an embodiment of the present invention, wherein a waste-gate valve mounted turbocharger includes a compressor bypass valve as an operation device.

Furthermore, as shown in the drawing, the turbocharger 2 shown in FIG. 4 is a waste-gate valve mounted turbocharger including a waste-gate valve, similar to the turbocharger 2 in FIG. 2. The waste-gate valve 73 is disposed in a turbine bypass passage 63 which brings into communication the upstream side and the downstream side of the turbine 2T in the exhaust passage 6. In other words, the exhaust passage 6 includes a turbine bypass passage 63 that brings into communication the upstream exhaust passage 61 and the downstream exhaust passage 62 so as to bypass the turbine 2T. Furthermore, the waste-gate valve 73 is disposed in the turbine bypass passage 63, and is configured to be capable of controlling the flow rate of exhaust gas passing through the turbine bypass passage 63 in accordance with the opening degree thereof. The opening degree of the waste-gate valve 73 is controlled between a full open position and a full closed position, by the surge avoidance control device 3 described below operating the actuator 72a, which is a mechanism for moving a valve, in accordance with the operation state of the engine 4. For instance, at the fully closed position, the flow of exhaust gas passing through the turbine bypass passage 63 is completely shut off. Furthermore, at the fully open position, the flow of exhaust gas is permitted to flow through the turbine bypass passage 63 to the maximum. Furthermore, at an intermediate degree between the fully closed position and the fully open position, the flow of exhaust gas corresponding to the opening degree is permitted. For instance, the opening degree of the waste-gate valve 73 is changed to the close side to increase the exhaust gas pressure during low-speed rotation of the engine 4, and the opening degree is changed to the open side during high-speed rotation of the engine 4.

Furthermore, the VG (variable nozzle mechanism 72) in FIGS. 1 to 3 and the waste-gate valve 73 in FIG. 4 are both configured to control the rotation speed of the compressor 2C through control of the rotation speed of the turbine 2T, and are used in the boost pressure control for matching the actual boost pressure (outlet pressure Po) to the target boost pressure Pt, which is a target value of the boost pressure. Accordingly, fuel consumption of the engine 4 is reduced. The boost pressure control is performed when the operation point of the compressor 2C is in the normal operation region Rn described below. The boost pressure control will be described later in detail.

Furthermore, as shown in the drawings, in the embodiment shown in FIGS. 1 an 4, the intake passage 5 includes a compressor bypass passage 53 which brings into communication the downstream side and the upstream side of the compressor 2C, unlike the embodiment shown in FIGS. 2 and 3. In other words, the compressor bypass passage 53 brings into communication the upstream intake passage 51 and the downstream intake passage 52 so as to bypass the compressor 2C. Furthermore, a compressor bypass valve 71 is disposed in the compressor bypass passage 53, and is configured to be capable of controlling the flow rate of intake air passing through the compressor bypass passage 53 in accordance with the opening degree thereof. More specifically, the opening degree of the compressor bypass valve 71 is controlled between a fully open position and a fully closed position, by the surge avoidance control device 3 described below operating the actuator 71*a*. For instance, at the fully closed position, the flow of intake air passing through the compressor bypass passage 53 is completely shut off. Furthermore, at the fully open position, the flow of exhaust gas is permitted to flow through the compressor bypass passage 53 to the maximum. Furthermore, at an intermediate degree between the fully closed position and the fully open position, the flow of intake air corresponding to the opening degree is permitted.

The surge avoidance control device 3 is a device for performing surging of the turbocharger 2 of the above described exhaust turbocharger 2 by controlling the opening degree of an operation device 7 capable of adjusting the operation point of the compressor 2C between the fully position and the fully closed position (see FIGS. 1 to 4). In the embodiment shown in FIGS. 1 and 4, the operation device 7 is a compressor bypass valve 71 disposed in the compressor bypass passage 53. In this case, with the compressor bypass valve 71 being the operation device 7, it is possible to reduce the pressure ratio Pf of the compressor 2C more directly than in a case where the variable nozzle mechanism 72 or the waste-gate valve 73 is the operation device 7, and thus it is possible to enhance the responsiveness of control of the operation point of the compressor in accordance with the avoidance operation of surging. In the embodiment shown in FIG. 2, the operation device 7 is a waste-gate valve 73 disposed in the turbine bypass passage 63. In the embodiment shown in FIG. 3, the operation device 7 is the variable nozzle mechanism 72, and is also used in the boost pressure control (described below) in the variable nozzle mechanism 72. In these cases, the turbocharger 2 with the variable nozzle mechanism 72 and the waste-gate valve 73 do not need to further include the compressor bypass valve 71, which makes it possible to suppress a cost increase.

Furthermore, the surge avoidance control device 3 performs the surge avoidance control method for the exhaust turbocharger 2 described below.

Figure 5:
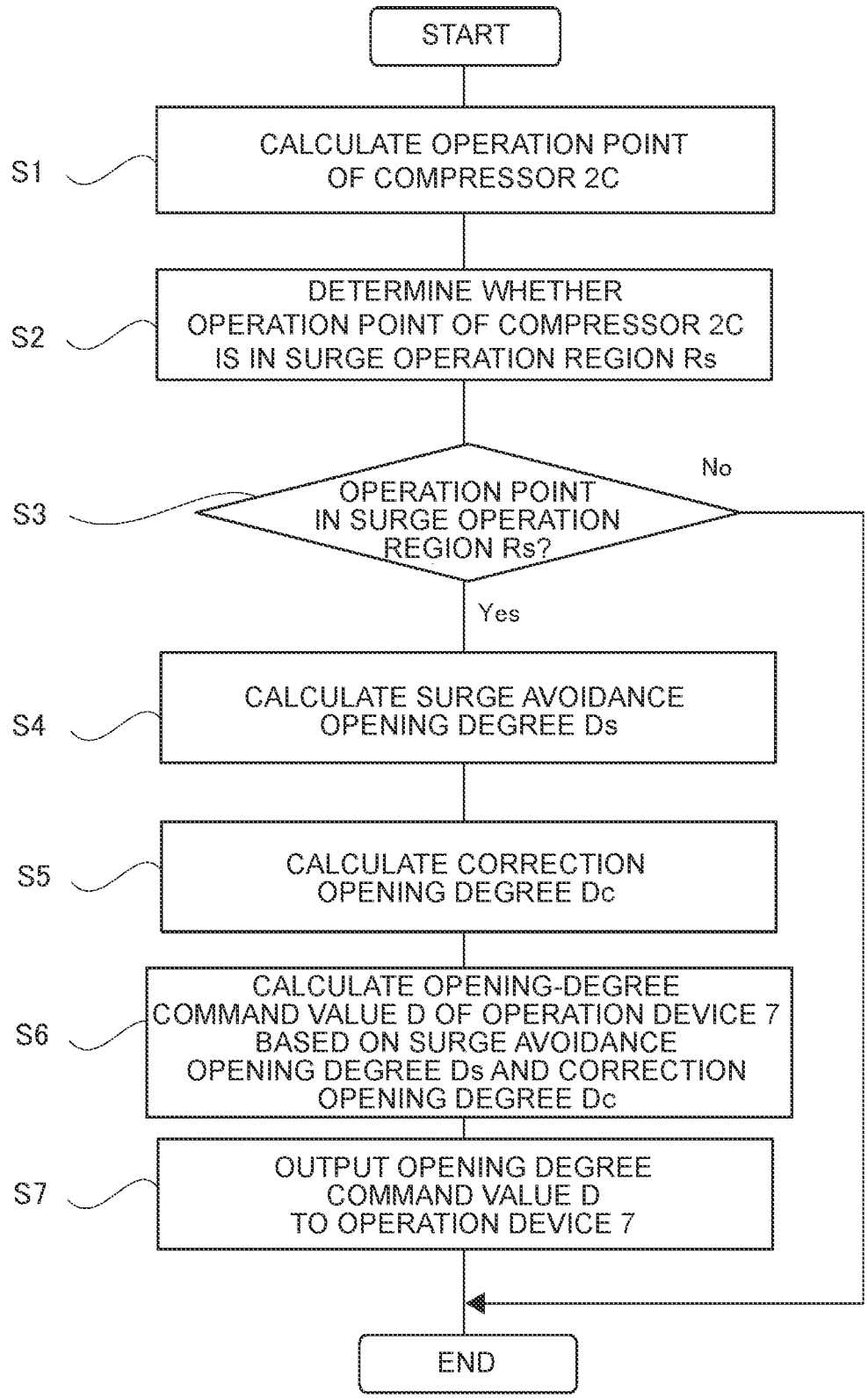
FIG. 5 is a flowchart showing a surge avoidance control method of an exhaust turbocharger according to an embodiment of the present invention.
Figure 6:
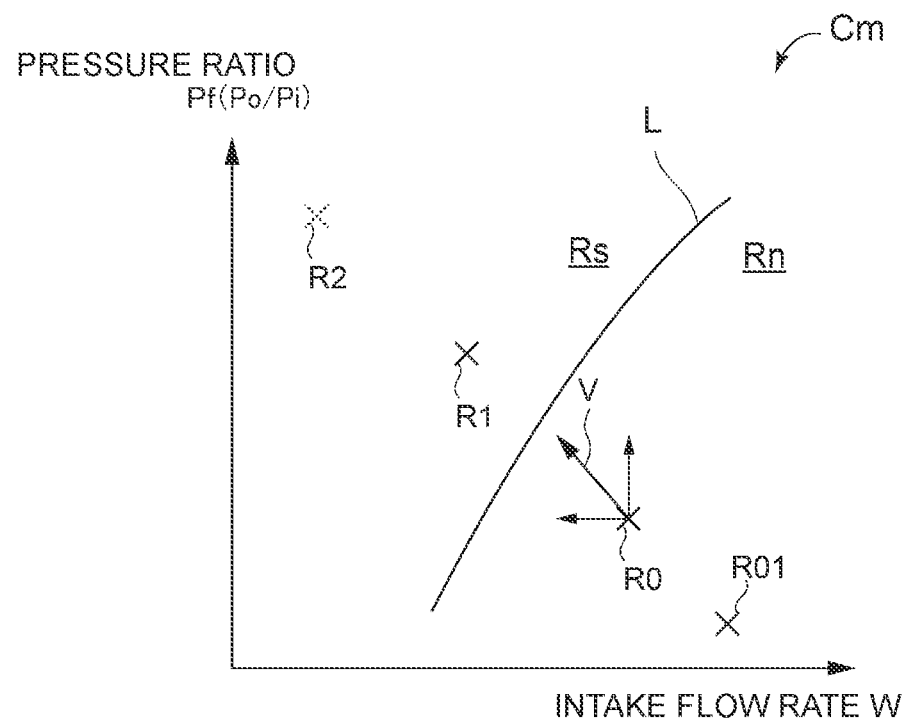
FIG. 6 is a diagram showing a compressor map according to an embodiment of the present invention.

Hereinafter, the surge avoidance control method for the exhaust turbocharger (hereinafter, referred to as surge avoidance control method where appropriate) will be described with reference to FIGS. 5 and 6. FIG. 5 is a flowchart showing a surge avoidance control method of for an exhaust turbocharger according to an embodiment of the present invention. FIG. 6 is a diagram showing a compressor map Cm according to an embodiment of the present invention. As shown in FIG. 5, the surge avoidance control method includes a surge detection step (S1 to S3), a surge avoidance opening-degree calculation step (S4), a correction opening-degree calculation step (S5), and an opening-degree command value calculation step (S6).

Hereinafter, the surge avoidance control method will be described along the flow of FIG. 5. In the following description, the surging avoidance control method in FIG. 5 is assumed to be executed in the embodiments shown in FIGS. 1 to 4. Furthermore, the operation point of the compressor 2C positioned in the surge operation region Rs described below will be referred to as the surge operation point (R1 and R2 in FIG. 6).

In steps S1 to S3 in FIG. 5, the surge detection step is performed. The surge detection step (S1 to S3) includes steps for determining whether the operation point of the compressor 2C is positioned in the surge operation region Rs, and performed at a predetermined timing as the flow of FIG. 5 is performed at a predetermined timing. In the embodiment shown in FIG. 5, the above predetermined timing is a periodic timing. Nevertheless, the present invention is not limited to this embodiment. In some other embodiments, the step may be performed at a predetermined timing when the operation point of the compressor 2C changes, for instance. Further, the surge detection step includes an operation point calculation step (S1) and a surge determination step (S2).

Specifically, in step S1 of FIG. 5, the operation point calculation step of calculating the operation point of the compressor 2C is performed. The operation point of the compressor 2C is an index for detecting surging. In the embodiment shown in FIGS. 1 to 4, the operation point is obtained from the pressure ratio Pf (Po/Pi) of the outlet pressure Po to the inlet pressure Pi and the intake flow rate W. The necessary information for calculating the pressure ratio Pf and the intake flow rate W are obtained by using the above described various sensors, for instance.

Furthermore, in step S2, a surge determination step is performed, which determines whether the operation point of the compressor 2C calculated in step S1 is positioned in the surge operation region Rs. More specifically, by comparing the operation point of the compressor 2C and the compressor map Cm, it is determined in which region of the compressor map Cm the operation point of the compressor 2C is positioned. Generally, the compressor map Cm is a map in which the vertical axis represents the pressure ratio Pf and the horizontal axis represents the intake flow rate W (see FIG. 6). Further, depending on the position of the operation point of the compressor 2C on the map, it is possible to determine the operation region and the efficiency of the turbocharger 2. FIG. 6 shows a part of the compressor map Cm, and as shown in the drawing, the surge operation region Rs is on the left side and the normal operation region Rn is on the right side, across the surge line L. The surge operation region Rs is a region where surging may occur, and the normal operation region Rn is a region where the turbocharger 2 operates normally.

In the next step S3, as a result of determination of the surge determination step (S2), if it is determined that the operation point of the compressor 2C is positioned in the normal operation region Rn, the flow of FIG. 5 is ended. In contrast, if it is determined that the operation point of the compressor 2C is positioned in the surge operation region Rs, the process advances to step S4 to perform the operation for surge avoidance. FIG. 6 shows three operation points (R0, R1, R2) of the compressor 2C for example. The drawings show a timing when the operation point R0 positioned in the normal operation region Rn on the compressor map Cm moves to the operation point R1 positioned in the surge operation region Rs at the next timing, and is about to move to the next operation point R2. In this example, if the operation point detected in the surge detection step (S1 to S3) is R0, the flow is ended immediately. If the operation point is R1 or R2, the process advances to an operation for avoiding surging (avoidance operation of surging) starting from the next step S4.

Specifically, in step S4 of FIG. 5, the surge avoidance opening degree calculation step of calculating the surge avoidance opening degree Ds is performed. The surge avoidance opening degree calculation step (S4) is a step for calculating the surge avoidance opening degree Ds of the operation device 7 necessary to move, outside of the surge operation region Rs, the operation point of the compressor 2C determined to be positioned in the surge operation region Rs in the surge detection step (S1 to S2). The surge avoidance opening degree Ds is an opening degree calculated on the basis of the surge operation point (R1 in FIG. 6). For instance, by using the avoidance opening degree map Md showing a relationship between the pressure ratio Pf, the intake flow rate W, and the surge avoidance opening degree Ds, the surge avoidance opening degree Ds may be calculated from the pressure ratio Pf and the intake flow rate W calculated in step S1. The avoidance opening degree map Md is prepared in advance through experiments.

In step S5, the correction opening degree calculation step of calculating the correction opening degree Dc is performed. The correction opening degree calculation step (S5) is a step for calculating the correction opening degree Dc of the operation device 7, on the basis of the moving velocity V of the operation point of the compressor 2C determined to be positioned in the surge operation region Rs in the surge detection step (S1 to s3). In the embodiment shown in FIG. 6, the correction opening degree Dc is calculated on the basis of the moving velocity V at the surge operation point (R1 in FIG. 6). The moving velocity V can be calculated from the operation point of the two compressors 2C. Specifically, it is possible to calculate the moving velocity V from the time of movement of the operation point from the operation point R0 to the operation point R1, and the distance between the operation point R0 and the operation point R1 on the compressor map Cm. As the moving velocity V is calculated on the basis of the earliest detected surge operation point, it is possible to calculate the moving velocity quickly. Alternatively, the operation point of the compressor 2C advancing further from the operation point R1 may be used, for instance, the operation point R2. It is also possible to calculate the moving velocity from the time of movement of the operation point from the operation point R1 to the operation point R2 and the distance between the operation point R1 and the operation point R2 on the compressor map Cm. Furthermore, the correction opening degree Dc may be calculated from the moving velocity V by using the correction opening degree map Mc indicating a relationship between the moving velocity V and the correction opening degree Dc. The correction opening degree Dc obtained by the correction opening degree map Mc may be a value of the same dimension as the surge avoidance opening degree Ds, or a value indicating a correction factor for correcting the surge avoidance opening degree Ds. The correction opening degree map Mc is prepared in advance through experiments.

In step S6, the opening degree command value calculation step of calculating the opening degree command value D is performed. The opening degree command value calculation step (S6) is a step of calculating the opening degree command value D of the operation device 7 on the basis of the surge avoidance opening degree Ds and the correction opening degree Dc. Specifically, by calculating the surge avoidance opening degree Ds and the correction opening degree Dc, the opening degree command value D is calculated. For instance, calculation like addition and subtraction may be performed if the surge avoidance opening degree Ds and the correction opening degree Dc have the same dimension, and calculation such as multiplication and division may be performed if the correction opening degree Dc is the above correction factor.

Furthermore, in the embodiment shown in FIG. 5, the operation device control step is performed in step S7. The operation device control step (S7) is a step of outputting the calculated opening degree command value D to the operation device 7. In accordance with the opening degree command value D, a mechanism (actuator 71a, 73b, variable nozzle mechanism 72) for changing the opening degree of the operation device 7 is controlled. The flow of FIG. 5 is ended after execution of step S7.

However, the present invention is not limited to the above described embodiments. For instance, in some embodiments, the surge detection step (S1 to S5 in FIG. 5) may be performed by calculating the moving velocity V of the operation point of the compressor 2C calculated in step S1 of FIG. 1, and predicting whether the operation point of the compressor 2C positioned in the normal operation region Rn moves to the surge operation region Rs at the next timing on the basis of the moving velocity V. The above will be described in detail with reference to FIG. 6. The moving velocity V of the operation point R0 positioned in the normal operation region Rn is calculated on the basis of the operation point R01 and the operation point R0 calculated before the operation point R0. Further, in a case where the latest operation point R0 calculated in step S1 of FIG. 5 is predicted to move to the surge operation region Rs on the basis of the calculated moving velocity V, such as to the operation point R1 at the next timing, it is determined that the operation point of the compressor 2C is positioned in the surge operation region Rs in step S2 of FIG. 5, and steps S4 to S7 in FIG. 5 are performed. For instance, the surge avoidance opening degree Ds may be calculated by using the above avoidance opening degree map Md on the basis of the operation point (R0 in FIG. 6), while regarding the operation point (R0 in FIG. 6) predicted to move to the surge operation region Rs at the next timing from the current position in the normal operation region Rn as the surge operation point. Alternatively, the surge avoidance opening degree Ds may be calculated by using the predicted operation point and the above avoidance opening degree map Md, while regarding the prediction operation point (R1 in FIG. 6) which is an operation point of the compressor C2 predicted to be positioned in the surge operation region Rs calculated on the basis of the moving velocity V of the operation point of the compressor 2C positioned in the normal operation region Rn and temporarily replacing the prediction operation point with the operation point (R0) serving as the basis of the prediction. Furthermore, the correction opening degree Dc is calculated on the basis of the moving velocity V calculated from R0 and R1 as described above. Accordingly, it is possible to perform the surge detection step in a feed-forward manner. If the above method determines that the operation point of the compressor 2C is positioned in the normal operation region RN, the flow of FIG. 5 is ended.

Herein, as described above, the reason why the opening degree command value D of the operation device 7 is calculated on the basis of the surge avoidance opening degree Ds and the correction opening degree Dc will be described. In the present invention, to suppress an excessive decrease in the boost pressure due to execution of avoidance operation of surging, the opening degree of the operation device 7 is controlled to an intermediate opening degree, instead of a fully-open opening degree (steps S4 to S7 in FIG. 5). For instance, while surging can be avoided by setting the opening degree, the boost pressure decreases maximally, which may retard acceleration from this state. Further, on the compressor map Cm, the operation point of the compressor 2C in a case where the opening degree of the operation device 7 is controlled to an intermediate degree moves from the surge operation point to the normal operation region Rn more closer to the surge line L than in a case where the opening degree of the operation device 7 is controlled to the fully open position.

For instance, as shown in FIG. 6, in a case where the operation point of the compressor 2C moves toward a predetermined position (e.g. operation point R2 or an operation point after R2) corresponding to a change in the operation state of the engine 4 on the compressor map Cm in accordance with a change in the operation state of the engine 4, as described above, the surge operation point indicated by the operation point R1 corresponds to the operation point in a transient time which is in the middle of all sections ending at the predetermined positions. Furthermore, in a case where the opening degree of the operation device 7 is determined so that the surge operation point (R1) moves to the normal operation region Rn in the vicinity of the surge line L only on the basis of information of the surge operation point (R1) at the time of transition (coordinate on the compressor map Cm) (i.e. opening degree command value D=surge avoidance opening degree Ds), depending on movement of the operation point after the surge operation point (R1), it may be impossible to move the operation point of the compressor 2C to the normal operation region R in the end. To avoid this situation, one may consider calculating the surge avoidance opening degree Ds with a margin so as to obtain an opening degree greater than needed by, for instance, making an avoidance opening degree map Md so as to obtain a surge avoidance opening degree Ds having a greater value that makes it possible to move the surge operation point reliably to the normal operation region Rn on the basis of the moving velocity V and the correction opening degree Dc, for instance. However, this method allows an unnecessary decrease in the boost pressure corresponding to the margin. Thus, in the present invention, as it is detected that the operation point of the compressor 2C is positioned in the surge operation region Rs, the opening degree command value D is calculated by using the correction opening degree De in addition to the surge avoidance opening degree Ds as described above, which makes it possible to adjust the opening degree command value D corresponding to the moving velocity V, thereby moving the operation point of the compressor 2C to the normal operation region Rn in the vicinity of the surge line L.

In the above description, the steps S4 to S7 in FIG. 5 are performed on the basis of the operation point (operation point R1 of FIG. 6) of the compressor 2C firstly determined to be positioned in the surge operation region. Nevertheless, the present invention is not limited to this. It is sufficient if steps S4 to S7 in FIG. 5 are performed on the basis of the surge operation point at the time of transition during movement of the operation point of the compressor 2C toward a predetermined position corresponding to the change in the operation state of the engine 4. For instance, in some other embodiments, the steps may be performed on the basis of the operation point R2 in FIG. 6 or another operation point at the time of transition after the operation point R2 in terms of time.

With the above configuration, at the time of transition of the operation point of the compressor 2C which moves in accordance with a change in the operation state of the engine 4, the opening degree command value D is calculated by adding the above described correction opening degree Dc to the surge avoidance opening degree Ds calculated on the basis of the surge operation point at the time of transition, and thereby it is possible to control the operation point of the compressor 2C to the vicinity of the surge line L in the normal operation region Rn. compared to a case of changing the opening degree of the operation device 7 to the fully-open position or controlling the opening degree with a margin. Accordingly, it is possible to suppress an excessive decrease in the boost pressure in the surging avoidance control, and to maximize the performance of the compressor 2C, while easily performing re-acceleration from the state in which the opening degree of the operation device 7 is changed to avoid surging. Furthermore, by calculating the opening degree command value D at the time of transition in movement of the operation point of the compressor 2C, it is possible to perform the surging avoidance operation quickly, and to avoid occurrence of surging more reliably.

Furthermore, in some embodiments, the correction opening degree calculation step (S5 in FIG. 5) may include calculating the correction opening degree Dc so that the correction opening degree Dc increases with the magnitude of the moving velocity V, and the opening degree command value calculation step (S6 in FIG. 5) may include calculating the opening degree command value D of the operation device 7 by adding the correction opening degree Dc to the surge avoidance opening degree Ds. The higher the moving velocity V of the operation point of the compressor 2C from the surge operation point is, the more the pressure ratio Pf (Po/Pi) is predicted to increase. Thus, to reduce the pressure ratio Pf even further, the opening degree command value D is increased. In other words, the higher the moving velocity V from the surge operation point is, the smaller the opening degree command value D is. As described above, by adjusting the opening degree command value D in accordance with the moving velocity V of the operation point from the surge operation point, it is possible to move the operation point of the compressor 2C to the vicinity of the limit of the surge line L from the surge operation point. Accordingly, it is possible to suppress an excessive decrease in the boost pressure in the surging avoidance control.

Figure 7:
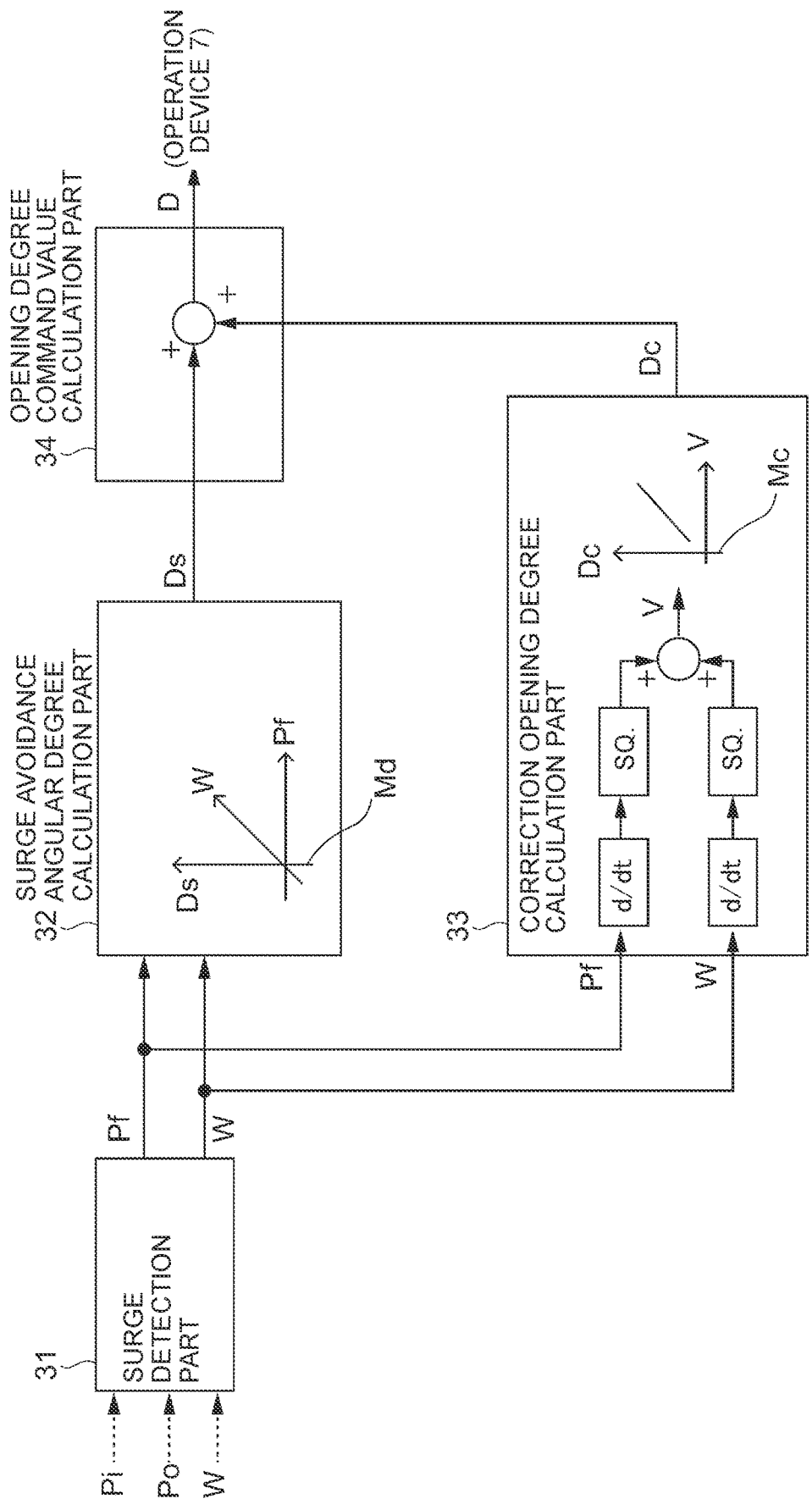
FIG. 7 is a configuration block diagram showing the configuration of a surge avoidance control device according to an embodiment of the present invention.

Next, the specific configuration of the surge avoidance control device 3 for performing the above described surge avoidance control method (FIG. 5) will be described with reference to FIG. 7. FIG. 7 is a configuration block diagram showing the configuration of a surge avoidance control device 3 according to an embodiment of the present invention. As shown in FIG. 7, the surge avoidance control device 3 includes a surge detection part (31), a surge avoidance opening-degree calculation part (32), a correction opening-degree calculation part (33), and an opening-degree command value calculation part (34). The surge avoidance control device 3 includes a computer such as an electronic control device (ECU), which includes a CPU (processor, not depicted) and a memory (storage device) such as ROM and RAM. The CPU operates (e.g. computation of data) in accordance with program instructions loaded to a main storage device, and thereby the above functional parts are implemented. In the memory (not depicted) of the surge avoidance control device 3, the above compressor map Cm (FIG. 6), the avoidance opening degree map Md, and the correction opening degree map Mc are stored, and each functional part is configured to be capable of referring to a necessary map through access to the memory (not shown).

Hereinafter, each functional part of the surge avoidance control device 3 described above will be described.

The surge detection part 31 is configured to determine whether the operation point of the compressor 2C is positioned in the surge operation region Rs every predetermined timing. That is, the surge detection part 31 performs a process corresponding to the surge detection step (steps S1 to S3 in FIG. 5) of the above described surge avoidance control method. In the embodiment shown in FIG. 7, the surge detection part 31 receives an outlet pressure Po (boost pressure) from the boost pressure sensor 24, an inlet pressure Pi from the inlet pressure sensor 25, and an intake flow rate W from the intake flow rate sensor 26 inputted thereto. Furthermore, the surge detection part 31 is configured to calculate the pressure ratio Pf (Po/Pi) of the inlet pressure Pi to the outlet pressure Po, and perform surge determination of determining whether the operation point of the compressor 2C determined on the basis of the pressure ratio Pf and the intake flow rate W is positioned in the surge operation region Rs. Furthermore, the surge detection part 31 is connected to the surge avoidance opening degree calculation part 32 and the correction opening degree calculation part 33, and is configured to output information (pressure ratio Pf and intake flow rate W) of the operation point of the compressor 2C determined as the surge operation point to each of the surge avoidance opening degree calculation part 32 and the correction opening degree calculation part 33. The predetermined timing is a periodic timing such as the calculation period or a periodic interval determined on the basis of the calculation period.

The surge avoidance opening degree calculation part 32 is configured to calculate the surge avoidance opening degree Ds of the operation device 7 necessary to move, outside of the surge operation region Rs, the operation point of the compressor 2C determined to be positioned in the surge operation region Rs by the surge detection part 31. That is, the surge avoidance opening degree calculation part 32 performs a process corresponding to the surge avoidance opening degree calculation step (step S4 in FIG. 5) of the above described surge avoidance control method. In the embodiment shown in FIG. 7, the surge avoidance opening degree calculation part 32 refers to the above described avoidance opening degree map Md, and thereby calculates the surge avoidance opening degree Ds from information (pressure ratio Pf and intake flow rate W) of the surge operation point inputted from the surge detection part 31. Furthermore, the surge avoidance opening degree calculation part 32 is connected to the opening degree command value calculation part 34, and is configured to output the calculated surge avoidance opening degree Ds to the opening degree command value calculation part 34.

The correction opening degree calculation part 33 is configured to calculate the correction opening degree Dc of the operation device 7, on the basis of the moving velocity V of the operation point of the compressor 2C determined to be positioned in the surge operation region Rs by the surge detection part 31. That is, the correction opening degree calculation part 33 performs a process corresponding to the correction opening degree calculation step (step S5 in FIG. 5) of the above described surge avoidance control method. In the embodiment shown in FIG. 7, the correction opening degree calculation part 33 calculates the correction opening degree Dc when information (pressure ratio Pf and intake flow rate W) of the surge operation point is inputted from the surge detection part 31. Specifically, in the embodiment shown in FIG. 7, each of the pressure ratio Pf and the intake flow rate W is differentiated, and then squared. Further, the square value of the differential of the pressure ratio Pf and the square value of the differential of the intake flow rate W are added to obtain the moving velocity V, and the moving velocity V is calculated from the square value of the moving velocity V. Furthermore, the correction opening degree calculation part 33 calculates the correction opening degree Dc from the calculated moving velocity V by using the correction opening degree map Mc indicating a relationship between the moving velocity V and the correction opening degree Dc. Furthermore, the correction opening degree calculation part 33 is connected to the opening degree command value calculation part 34, and is configured to output the calculated correction opening degree Dc to the opening degree command value calculation part 34.

The opening degree command value calculation part 34 is configured to calculate the opening degree command value D of the operation device 7 on the basis of the surge avoidance opening degree Ds and the correction opening degree Dc. That is, the opening degree command value calculation part 34 performs a process corresponding to the opening degree command value calculation step (step S6 in FIG. 5) of the above described surge avoidance control method. In the embodiment shown in FIG. 7, the opening degree command value calculation part 34 is connected to each of the surge avoidance opening degree calculation part 32 and the correction opening degree calculation part 33. To the opening degree command value calculation part 34, the surge avoidance opening degree Ds is inputted from the surge avoidance opening degree calculation part 32, and the correction opening degree Dc is inputted from the correction opening degree calculation part 33. Furthermore, by adding calculation to the surge avoidance opening degree Ds and the correction opening degree Dc, the opening degree command value D is calculated. More specifically, the above described correction opening degree calculation part 33 calculates the correction opening degree Dc so that the correction opening degree Dc increases with the magnitude. Furthermore, the opening degree command value calculation part 34 is configured to calculate the opening degree command value D of the operation device 7 by adding the correction opening degree Dc to the surge avoidance opening degree Ds.

Furthermore, the opening degree command value calculation part 34 is connected to the operation device 7, and is configured to output the opening degree command value D to the operation device 7. Accordingly, the operation device 7 is controlled to have an opening degree corresponding to the opening degree command value D.

With the above configuration, it is possible to provide a surge avoidance control device 3 which performs the surge avoidance control method of each of the above embodiments. Accordingly, it is possible to suppress an excessive decrease in the boost pressure in the surging avoidance control.

Figure 8:
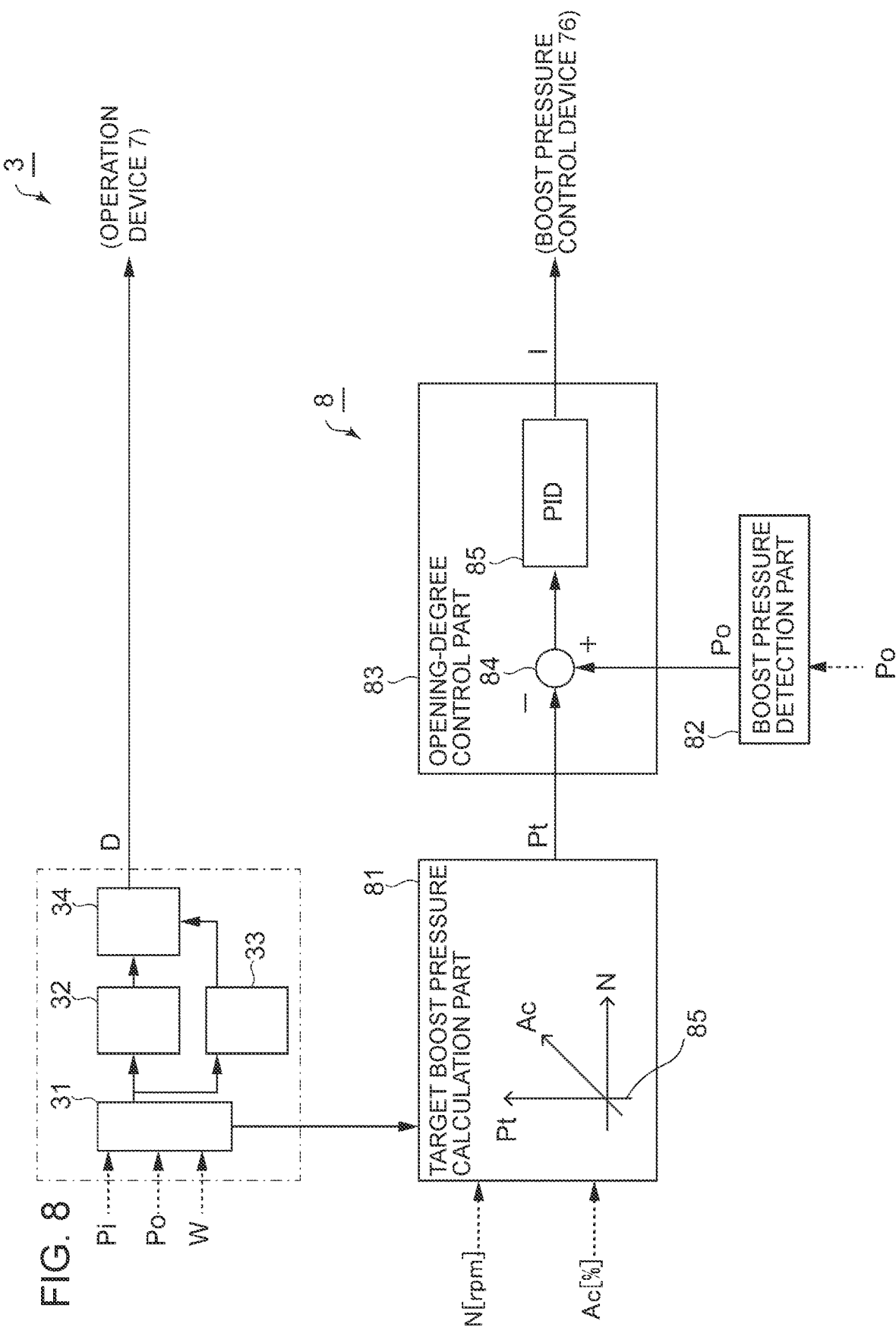
FIG. 8 is a block diagram describing a boost pressure control according to an embodiment of the present invention.

Hereinafter, the above described boost pressure control will be described with reference to FIGS. 8 and 9. FIG. 8 is a block diagram describing a boost pressure control according to an embodiment of the present invention. In the embodiment shown in FIG. 8, the boost pressure control is performed by the boost pressure control part 8 realized as a functional part of the surge avoidance control device 3. Nevertheless, the present invention is not limited to this embodiment, and the boost pressure control may be performed by another electronic control device (ECU) or a dedicated ECU. The surge detection part 31, the surge avoidance opening degree calculation part 32, the correction opening degree calculation part 33, and the opening degree command value calculation part 34 in FIG. 8 are the same as those described above with reference to FIG. 7, and thus not described again.

Specifically, the boost pressure control part 8 includes a target boost pressure calculation part 81 for calculating the target boost pressure Pt on the downstream side of the compressor 2C on the basis of the rotation speed N of the engine 4 and the accelerator position Ac, a boost pressure detection part 82 for detecting the boost pressure on the downstream side of the compressor 2C, and an opening-degree control part 83 for controlling the nozzle opening degree of the variable nozzle mechanism or the opening degree of the waste-gate valve so that the boost pressure matches the target boost pressure Pt. In the embodiment shown in FIG. 8, the accelerator position Ac (%) is a ratio of the operation amount to the maximum operation amount of the accelerator pedal 13, and is obtained on the basis of a detection value of the accelerator position sensor 14 capable of detecting the operation amount of the accelerator pedal 13, for instance. As shown in FIG. 8, the accelerator position Ac may be calculated in a stage before the target boost pressure calculation part 81, or the target boost pressure calculation part 81 may calculate the accelerator position Ac on the basis of the detection value obtained by the accelerator position sensor 14. Furthermore, the rotation speed N (rpm) of the engine 4 is obtained by using a sensor capable of detecting the rotation speed N of the engine 4. Furthermore, the target boost pressure calculation part 81 includes a target boost pressure map 86 showing a relationship between the rotation speed N (rpm) of the engine 4, the accelerator position Ac (%), and the target boost pressure Pt (kPa). Further, the target boost pressure calculation part 81 calculates the target boost pressure Pt by referring to the target boost pressure map 86 on the above memory (not depicted), when the rotation speed N of the engine 4 and the accelerator position Ac are inputted.

The boost pressure detection part 82 is connected to the above boost pressure sensor 24, and detects the boost pressure (outlet pressure Po) in response to input of an actual boost pressure.

Furthermore, the opening-degree control part 83 includes a comparison part 84 for calculating a difference between the target boost pressure Pt and the boost pressure, and a feedback control part 85 for controlling the opening degree of each of the boost pressure control devices (the variable nozzle mechanism 72 in FIGS. 1 to 3, the waste-gate valve 73 in FIG. 4) which do not have the function of the above described operation device 7, through a feedback control such as PID in response to input of a calculation result of the comparison part 84. Further, the feedback control part 85 determines the nozzle opening degree of the variable nozzle mechanism 72 the opening degree of the waste-gate valve 73 (boost pressure control opening degree I) corresponding to the calculation result of the comparison part 84, and outputs the boost pressure control opening degree I of the above described boost pressure control device 9 so that a difference calculated in the comparison part 84 decreases, thereby performing a feedback control.

Furthermore, in the embodiment shown in FIG. 8, the target boost pressure calculation part 81, the boost pressure detection part 82, and the opening-degree control part 83 are configured to perform a process if the above described surge detection part 31 determines that the operation point of the compressor 2C is not positioned in the surge operation region Rs. Specifically, as shown in FIG. 8, the target boost pressure calculation part 81 is connected to the above described surge detection part 31. Furthermore, the surge detection part 31 outputs signal information indicating determination of the surge operation point to the target boost pressure calculation part 81, and the target boost pressure calculation part 81 is configured to determine whether to perform the process on the basis of the signal information inputted from the surge detection part 31. Accordingly, the boost pressure control is stopped when the surging avoidance operation (steps S4 to S7 in FIG. 5) is performed. In other words, switching is performed such that the boost pressure control is performed in a case where the calculated operation point of the compressor 2C is positioned in the normal operation region Rn, and the surging avoidance operation as in the surge avoidance control method (FIG. 5) is performed in a case where the operation point of the compressor 2C is positioned in the surge operation region Rs.

Accordingly, it is possible to control the actual boost pressure to the target boost pressure Pt corresponding to the operation state of the engine 4 in a case where the operation point of the compressor 2C is positioned in the normal operation region Rn. In contrast, in a case where the operation point of the compressor 2C is positioned in the surge operation region Rs, the surging avoidance operation can be performed without being affected by the continuous execution of the boost pressure control. In particular, in the embodiment shown in FIG. 3, the variable nozzle mechanism 72 has both functions of the operation device 7 and the boost pressure control device 9. Thus, through switching of the control, it is possible to perform an intended control reliably without performing a complex control. Furthermore, in some other embodiments, in the embodiment shown in FIGS. 1 to 2, and 4, the control of the opening degree of the operation device 7 by the surging avoidance operation and the control of the opening degree of the boost pressure control device 9 by the boost pressure control may be performed at the same time.

Figure 9:
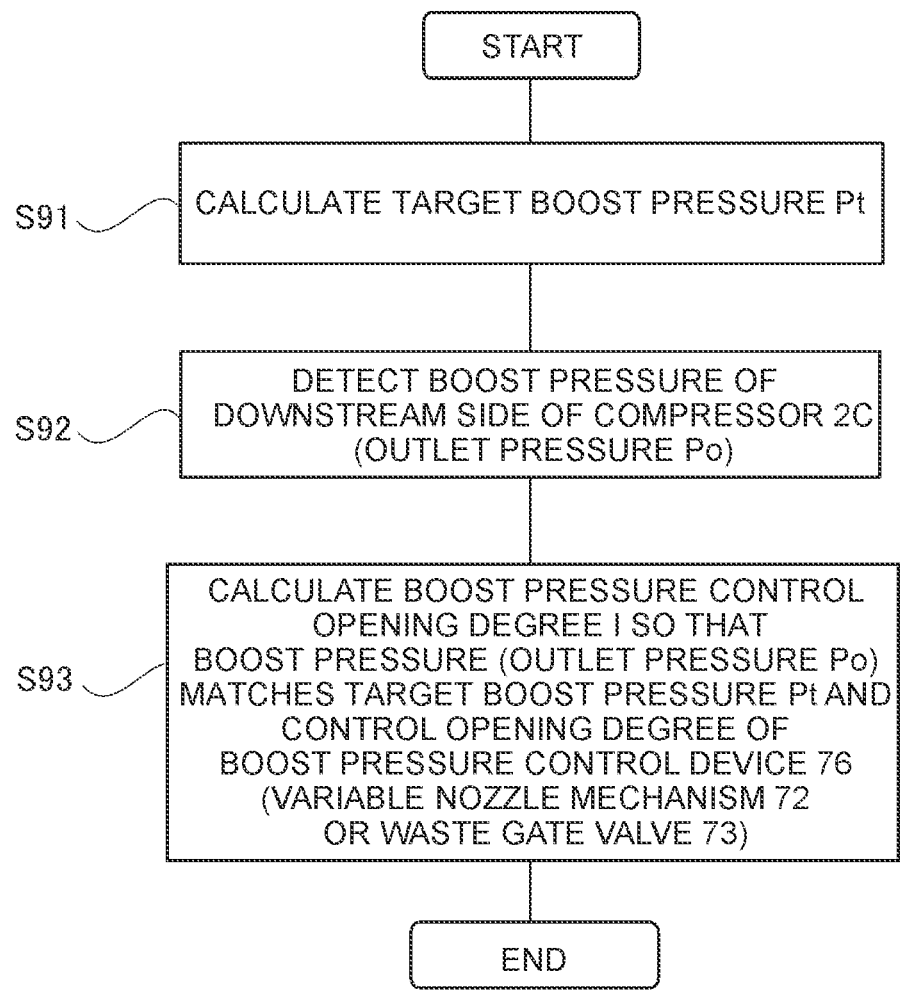
FIG. 9 is a flowchart showing a boost pressure control method according to an embodiment of the present invention.

FIG. 9 is a flowchart showing a boost pressure control method according to an embodiment of the present invention. As shown in FIG. 9, the boost pressure control method includes a target boost pressure calculation step (S91), a boost pressure detection step (S92), and an opening-degree control step (S93). Each of the above steps will be described along the flow of FIG. 9. In the following description, the boost pressure control in FIG. 9 is assumed to be executed in the embodiments shown in FIGS. 1 to 4 by the surge avoidance control device 3 or the like having the above configuration.

In step S91, the target boost pressure calculation step of calculating the target boost pressure Pt is performed. The target boost pressure calculation step (S91) is a step of calculating the target boost pressure Pt on the downstream side of the compressor 2C on the basis of the rotation speed N of the engine 4 and the accelerator position Ac. For instance, the accelerator position Ac may be a ratio of the operation amount to the maximum operation amount of the accelerator pedal 13. Furthermore, the target boost pressure Pt (kPa) may be calculated from the rotation speed N (rpm) of the engine 4, and the accelerator position Ac (%) by referring to the target boost pressure map 86 indicating a relationship between the rotation speed N (rpm) of the engine 4, the accelerator position Ac (%), and the target boost pressure Pt (kPa).

In step S92, the boost pressure detection step of detecting the boost pressure (outlet pressure Po) on the downstream side of the compressor 2C is performed. For instance, the boost pressure may be detected by using the boost pressure sensor 24.

In step S93, the opening degree control step of controlling the opening degree of the boost pressure control device 9 so that the boost pressure matches the target boost pressure Pt is performed. That is, in the opening-degree control step (S93), the nozzle opening degree (embodiment shown in FIGS. 1 to 3) of the variable nozzle mechanism 72, or the waste-gate valve 73 (embodiment in FIG. 4) are controlled so that the boost pressure matches the target boost pressure Pt.

Furthermore, the target boost pressure calculation step (S91), the boost pressure detection step (S92), and the opening-degree control step (S93) may be performed in a case where it is determined that the operation point of the compressor 2C is not positioned in the surge operation region Rs in the surge detection step (S1 to S3 in FIG. 5). Accordingly, it is possible to control the actual boost pressure to the target boost pressure Pt corresponding to the operation state of the engine 4 in a case where the operation point of the compressor 2C is positioned in the normal operation region Rn. In contrast, in a case where the operation point of the compressor 2C is positioned in the surge operation region Rs, the surging avoidance operation can be performed without being affected by the continuous execution of the boost pressure control.

Embodiments of the present invention were described in detail above, but the present invention is not limited thereto, and various amendments and modifications may be implemented.

For instance, in the embodiment shown in FIG. 9, the variable nozzle mechanism 72 have both functions of the operation device 7 and the boost pressure control device 9, but in some other embodiments, in the waste-gate valve mounted turbocharger, the compressor bypass valve 71 and the variable nozzle mechanism 72 are not provided, and the waste-gate valve 73 may have both functions of the operation device 7 and the boost pressure control device 9 similarly to the embodiment shown in FIG. 3.

DESCRIPTION OF REFERENCE NUMERALS

1 Engine system
13 Accelerator pedal
14 Accelerator position sensor
2 Turbocharger
2 Compressor
2S Rotational shaft
2T Turbine
24 Boost pressure sensor
25 Inlet pressure sensor
26 Intake flow rate sensor
3 Surge avoidance control device
31 Surge detection part
32 Surge avoidance opening degree calculation part
33 Correction opening degree calculation part
34 Opening degree command value calculation part
4 Engine
41 Combustion chamber
43 Intake port
44 Exhaust port
5 Intake passage
51 Upstream intake passage
52 Downstream intake passage
53 Compressor bypass passage
54 Air cleaner
55 Inter cooler
56 Throttle valve
57 Fuel injection nozzle
6 Exhaust passage
61 Upstream exhaust passage
62 Downstream exhaust passage
63 Turbine bypass passage
7 Operation device
71 Compressor bypass valve
71a Actuator
72 Variable nozzle mechanism
73 Waste-gate valve
73a Actuator
8 Boost pressure control part
81 Target boost pressure calculation part
82 Boost pressure detection part
83 Opening-degree control part
84 Comparison part
85 Feedback control part
86 Target boost pressure map
9 Boost pressure control device
D Opening degree command value
Dc Correction opening degree
Ds Surge avoidance opening degree
Mc Correction opening degree map
Md Avoidance opening degree map
Cm Compressor map
Rn Normal operation region
Rs Surge operation region
R01 Operation point
R0 Operation point
R1 Operation point (surge operation point)
R2 Operation point (surge operation point)
L Surge line
Pf Pressure ratio
Pi Inlet pressure
Po Outlet pressure (boost pressure)
Pt Target boost pressure
N Rotation speed of engine
Ac Accelerator position
I Boost pressure control opening degree
W Intake flow rate
V Moving velocity

The invention claimed is:

1. A surge avoidance control method of avoiding surging in an exhaust turbocharger which comprises a turbine rotated by exhaust gas from an engine and a compressor rotatably driven by the turbine, by controlling an opening degree of an operation device capable of adjusting an operation point of the compressor between fully open and fully closed, the method comprising:
   a surge detection step of determining whether the operation point of the compressor is positioned in a surge operation region at each predetermined timing;
   a surge avoidance opening-degree calculation step of calculating a surge avoidance opening degree of the operation device necessary for moving the operation point of the compressor determined to be positioned in the surge operation region in the surge detection step out of the surge operation region;
   a correction opening-degree calculation step of calculating a correction opening degree of the operation device on the basis of a moving velocity of the operation point of the compressor which is determined to be positioned in the surge operation region in the surge detection step; and
   an opening-degree command value calculation step of calculating an opening-degree command value of the operation device on the basis of the surge avoidance opening degree and the correction opening degree,
   wherein the correction opening-degree calculation step includes calculating the correction opening degree so that the correction opening degree increases in accordance with a magnitude of the moving velocity, and
   wherein the opening-degree command value calculation step includes calculating the opening-degree command value of the operation device by adding the correction opening degree to the surge avoidance opening degree.

2. The surge avoidance control method for an exhaust turbocharger according to claim 1,
   wherein the operation device comprises a compressor bypass valve disposed in a compressor bypass passage which brings into communication a downstream side and an upstream side of the compressor in an intake passage of the engine.

3. The surge avoidance control method for an exhaust turbocharger according to claim 1,
wherein the operation device comprises a variable nozzle mechanism capable of adjusting a flow velocity of exhaust gas which flows into the turbine.

4. The surge avoidance control method for an exhaust turbocharger according to claim 1,
wherein the operation device comprises a waste-gate valve disposed in a turbine bypass passage which brings into communication a downstream side and an upstream side of the turbine in an exhaust passage of the engine.

5. The surge avoidance control method for an exhaust turbocharger according to claim 2, further comprising:
a target boost-pressure calculation step for calculating a target boost pressure at a downstream side of the compressor on the basis of a rotation speed and an accelerator position of the engine;
a boost-pressure detection step of detecting a boost pressure at the downstream side of the compressor; and
an opening degree control step of controlling a nozzle opening degree of a variable nozzle mechanism capable of adjusting a flow velocity of exhaust gas which flows into the turbine so that the boost pressure matches the target boost pressure,
wherein the target boost-pressure calculation step, the boost-pressure detection step, and the opening-degree control step are performed if it is determined that the operation point of the compressor is not positioned in the surge operation region in the surge detection step.

6. The surge avoidance control method for an exhaust turbocharger according to claim 2, further comprising:
a target boost-pressure calculation step for calculating a target boost pressure at a downstream side of the compressor on the basis of a rotation speed and an accelerator position of the engine;
a boost-pressure detection step of detecting a boost pressure at the downstream side of the compressor; and
an opening degree control step of controlling an opening degree of a waste-gate valve disposed in a turbine bypass passage which brings into communication a downstream side and an upstream side of the turbine in an exhaust passage of the engine so that the boost pressure matches the target boost pressure,
wherein the target boost-pressure calculation step, the boost-pressure detection step, and the opening-degree control step are performed if it is determined that the operation point of the compressor is not positioned in the surge operation region in the surge detection step.

7. A surge avoidance control device for an exhaust turbocharger which comprises a turbine rotated by exhaust gas from an engine and a compressor rotatably driven by the turbine, by controlling an opening degree of an operation device capable of adjusting an operation point of the compressor between fully open and fully closed, the surge avoidance control device comprising:
a surge detection part configured to determine whether the operation point of the compressor is positioned in a surge operation region at each predetermined timing;
a surge avoidance opening-degree calculation part configured to calculate a surge avoidance opening degree of the operation device necessary for moving the operation point of the compressor determined to be positioned in the surge operation region by the surge detection part out of the surge operation region;
a correction opening-degree calculation part configured to calculate a correction opening degree of the operation device on the basis of a moving velocity of the operation point of the compressor which is determined to be positioned in the surge operation region by the surge detection part; and
an opening-degree command value calculation part of calculating an opening-degree command value of the operation device on the basis of the surge avoidance opening degree and the correction opening degree,
wherein the correction opening-degree calculation part is configured to calculate the correction opening degree so that the correction opening degree increases in accordance with a magnitude of the moving velocity, and
wherein the opening-degree command value calculation part is configured to calculate the opening-degree command value of the operation device by adding the correction opening degree to the surge avoidance opening degree.

8. The surge avoidance control device for an exhaust turbocharger according to claim 7,
wherein the operation device comprises a compressor bypass valve disposed in a compressor bypass passage which brings into communication a downstream side and an upstream side of the compressor in an intake passage of the engine.

9. The surge avoidance control device for an exhaust turbocharger according to claim 7,
wherein the operation device comprises a variable nozzle mechanism capable of adjusting a flow velocity of exhaust gas which flows into the turbine.

10. The surge avoidance control device for an exhaust turbocharger according to claim 7,
wherein the operation device comprises a waste-gate valve disposed in a turbine bypass passage which brings into communication a downstream side and an upstream side of the turbine in an exhaust passage of the engine.

11. The surge avoidance control device for an exhaust turbocharger according to claim 8, further comprising:
a target boost-pressure calculation part configured to calculate a target boost pressure at a downstream side of the compressor on the basis of a rotation speed and an accelerator position of the engine;
a boost-pressure detection part configured to detect a boost pressure at the downstream side of the compressor; and
an opening-degree control part configured to control a nozzle opening degree of a variable nozzle mechanism capable of adjusting a flow velocity of exhaust gas which flows into the turbine so that the boost pressure matches the target boost pressure,
wherein the target boost-pressure calculation part, the boost-pressure detection part, and the opening-degree control part are performed if it is determined that the operation point of the compressor is not positioned in the surge operation region by the surge detection part.

12. The surge avoidance control device for an exhaust turbocharger according to claim 8, further comprising:
a target boost-pressure calculation part configured to calculate a target boost pressure at a downstream side of the compressor on the basis of a rotation speed and an accelerator position of the engine;

a boost-pressure detection part configured to detect a boost pressure at the downstream side of the compressor; and an opening-degree control part configured to control an opening degree of a waste-gate valve disposed in a turbine bypass passage which brings into communication a downstream side and an upstream side of the turbine in an exhaust passage of the engine so that the boost pressure matches the target boost pressure, wherein the target boost-pressure calculation part, the boost-pressure detection part, and the opening-degree control part are performed if it is determined that the operation point of the compressor is not positioned in the surge operation region by the surge detection part.

* * * * *